US008099449B1

(12) United States Patent
Schultz

(10) Patent No.: US 8,099,449 B1
(45) Date of Patent: Jan. 17, 2012

(54) METHOD OF AND CIRCUIT FOR GENERATING A RANDOM NUMBER USING A MULTIPLIER OSCILLATION

(75) Inventor: David P. Schultz, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 1139 days.

(21) Appl. No.: 11/973,040

(22) Filed: Oct. 4, 2007

(51) Int. Cl.
*G06F 1/02* (2006.01)
(52) U.S. Cl. .................................................. 708/250
(58) Field of Classification Search ............ 708/250.251
See application file for complete search history.

(56) References Cited

U.S. PATENT DOCUMENTS

| 6,731,670 B1 * | 5/2004 | Kido et al. ............... 375/140 |
| 6,954,770 B1 | 10/2005 | Carlson et al. |
| 6,968,493 B1 * | 11/2005 | Weng ....................... 714/782 |
| 2005/0097153 A1 * | 5/2005 | Dirscherl et al. ........... 708/250 |

FOREIGN PATENT DOCUMENTS

JP 58016345 A * 1/1983

OTHER PUBLICATIONS

Benjamin Jun, and Paul Kocher, "the Intel Random Number Generator", Cryptography Research, Inc., White Paper Prepared for Interl Corporation, Apr. 22, 1999, 1-8 pages.
Marsaglia, George, "The Marsaglia Random Number CDROM including the Diehard Battery of Tests of Randomness", printed from website on Oct. 3, 2007, 1 page, http://www.stat.fsu.edu/pub/diehard/.

* cited by examiner

*Primary Examiner* — Chuong D Ngo
(74) *Attorney, Agent, or Firm* — John J. King; Thomas George

(57) ABSTRACT

A method of generating a random number using a multiplier oscillation, the method comprising providing a multiplier circuit coupled to receive a first digital input and a second digital input, wherein the first digital input and the second digital input are asynchronous signals and the first digital input comprises a feedback signal based upon an output of the multiplier circuit; allowing the multiplier to enter a state of feedback oscillation; and generating a random number based upon the output of the multiplier circuit. The method may further comprise providing a plurality of adders receiving feedback signals.

19 Claims, 6 Drawing Sheets

METHOD OF AND CIRCUIT FOR GENERATING A RANDOM NUMBER USING A MULTIPLIER OSCILLATION

FIELD OF THE INVENTION

The present invention relates generally to integrated circuits, and in particular, to a method of and circuit for generating a random number using a multiplier oscillation.

BACKGROUND

There are many applications in which it is desirable to generate truly random numbers. For example, cryptography, system testing, and gaming all rely upon random number generators to perform their functions. Random number generation in cryptography is particularly significant. Cryptography is a central part of information security and related issues, such as authentication and access control. Cryptography is used in computer and network security for information confidentiality. Cryptography is also used in many applications encountered by individuals on a regular basis, such as security of ATM cards, computer passwords, and electronic commerce. However, generating a true random number sequence on a digital integrated circuit is a difficult task.

Most digital implementations of random number generators (RNGs) are in fact pseudo random number generators, such as linear feedback shift registers (LFSRs). An LFSR produces a predictable sequence of numbers which is repeated after some number of cycles. There are other types of RNGs such as Linear Congruential Generators (LCGs), Add With Carry Generators (AWCGs), Multiply With Carry Generators (MWCGs), and Inverse Congruential Generators (ICGs). These RNGs generally use formulas of the form $x(n)=f(x(n-m))$ and have predictable output streams. Other integrated circuit implementations use analog techniques such as measuring voltage noise in a resistor and then converting that measurement into digital numbers using an analog-to-digital converter (ADC). However, converting the analog noise signal requires special analog circuitry that is not found on digital integrated circuits.

Accordingly, there is a need for an improved method of and circuit for generating a random number in a digital circuit.

SUMMARY

A method of generating a random number using a multiplier oscillation is disclosed. The method comprises providing a multiplier circuit coupled to receive a first digital input and a second digital input, wherein the first digital input and the second digital input are asynchronous signals and the first digital input comprises a feedback signal based upon an output of the multiplier circuit; allowing the multiplier to enter a state of feedback oscillation; and generating the random number based upon the output of the multiplier circuit. The method may further comprise providing a plurality of adders receiving feedback signals.

According to an alternate embodiment, a method of generating a random number using a multiplier oscillation comprises providing a first adder circuit in a first stage of a circuit for generating a random number; performing an addition using a first subset of an output of the first adder circuit and a second subset of the output of the first adder circuit; coupling a multiplier circuit to an input of a second adder circuit in a second stage of the circuit for generating a random number; performing a multiplication of a first subset of an output of the second adder circuit with a second subset of the output of the second adder circuit; and generating a random number by adding the output of the first adder circuit and the output of the second adder circuit.

A system for generating a random number using a multiplier oscillation is also disclosed. The system comprises a multiplier circuit coupled to receive a first digital input and a second digital input, wherein the first digital input and the second digital input are asynchronous signals; a feedback path coupled between an output of the multiplier circuit and an input of the multiplier, wherein the first digital input comprises a feedback signal based upon the output of the multiplier circuit; and an output circuit coupled to provide a random number generated at an output of the system based upon the output of the multiplier circuit. The system may further comprise a plurality of adders for receiving feedback signals.

DETAILED DESCRIPTION OF THE DRAWINGS

Figure 1:
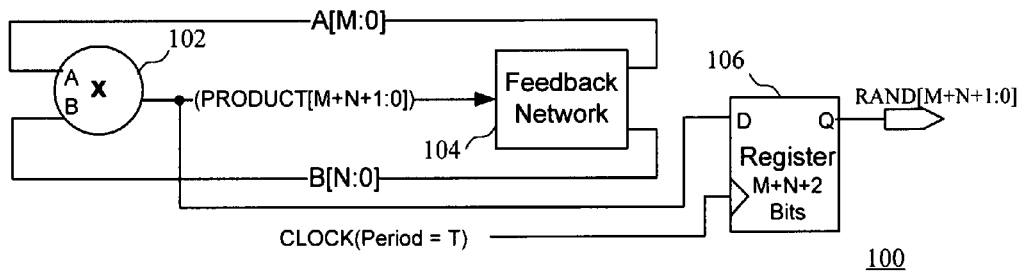
FIG. 1 is a block diagram of a system for generating a random number according to an embodiment of the present invention.

Turning first to FIG. 1, a block diagram of a system or circuit for generating a random number according to an embodiment of the present invention is shown. According to the random number generator of FIG. 1, a multiplier circuit 102 is coupled to receive a first digital input and a second digital input, wherein the first digital input and the second digital input are asynchronous signals and may comprise feedback signals, for example. In particular, the output of the multiplier circuit 102 is coupled to a feedback network 104, while feedback signals A[M:0] and B[N:0] are provided from an output of the feedback network to an input of the multiplier to allow the multiplier to enter a state of feedback oscillation. The network may include inversion, bit reversal, decimation, interpolation, and/or other arithmetic functions. However, to ensure that the feedback signals are asynchronous, no registers, flip-flops, or other elements that are clocked are used in the feedback network to generate the feedback signals. The random numbers RAND, which may be samples of the product at some time interval T and comprise M+N+2 bits, are generated at an output of the system based upon the output of the multiplier circuit. For example, a register 106 clocked using a clock having a period of T may be used to store the output of the multiplier. While any other suitable circuit element for sampling the output of the multiplier may be employed, it should be noted that the circuit element for sampling the output is outside of the feedback network, and therefore the inputs to the multiplier circuit are asynchronous.

For example, a random number generator can be based on a hardware multiplier, such as a multiplier which is found on programmable logic devices. The hardware multiplier is connected as a multiple path ring oscillator where the outputs are inverted and fed back to the inputs. The multiplier outputs will oscillate at a frequency determined by a number of different factors including the silicon process, individual characteristics of transistors, supply-voltage, temperature, and the parasitic loading of internal nodes in the multiplier circuit. Because these factors will tend to vary, a unique pattern of number generation will result for every instance of the system.

Figure 2:
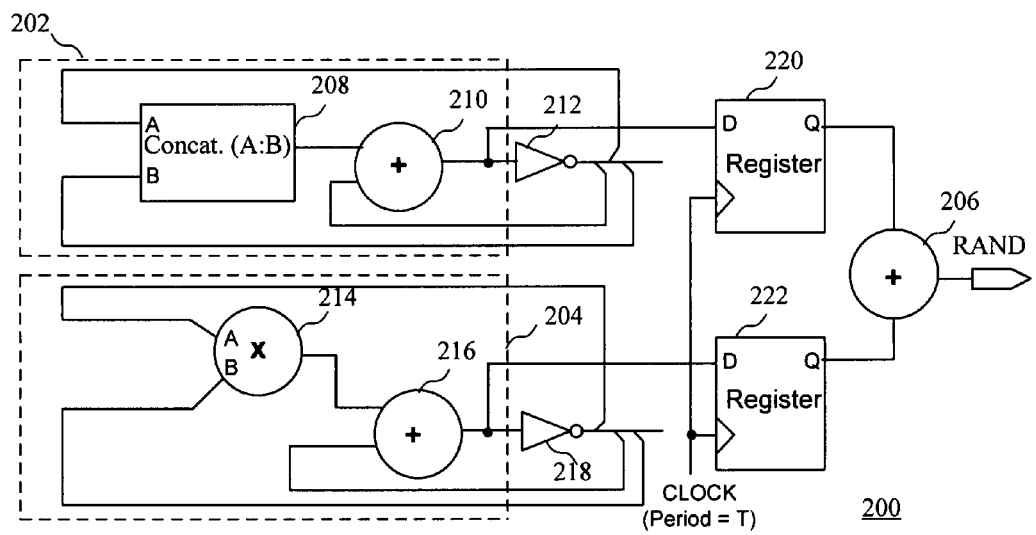
FIG. 2 is a block diagram of a circuit for generating a random number according to an alternate embodiment of the present invention.

Turning now to FIG. 2, a block diagram of a system or circuit for generating a random number according to an alternate embodiment of the present invention is shown. According to the random number generator of FIG. 2, a first stage 202 comprising an adder stage and a second stage 204 comprising a multiplier/adder stage are coupled to an adder circuit 206. The adder stage comprises a concatenation circuit 208 which is coupled to receive a first input A and a second input B. As will be described in more detail according to one embodiment of the invention, the inputs to the concatenation circuit may receive predetermined inverted bits of the output of an adder circuit 210, which is coupled to provide the sum of the output of the concatenation circuit 208 and another predetermined output of the adder 210, which is inverted by inverters 212. The second stage 204 comprises a multiplier 214 which is also coupled to receive inverted output bits of an adder. In particular, an adder circuit 216 is coupled to receive the output of multiplier 214 and another predetermined inverted output. The multiplier receives predetermined inverted bits of the output of the adder circuit 216 which are inverted by inverters 218. The output of the adder circuit 210 is coupled to a register 220, while the output of the adder circuit 216 is coupled to a register 222, each of which is clocked by a clock signal having a period T. The outputs of the registers which store data at the predetermined clock rate are coupled to the adder circuit 206, which generates a random number RAND at a period of T.

Figure 3:
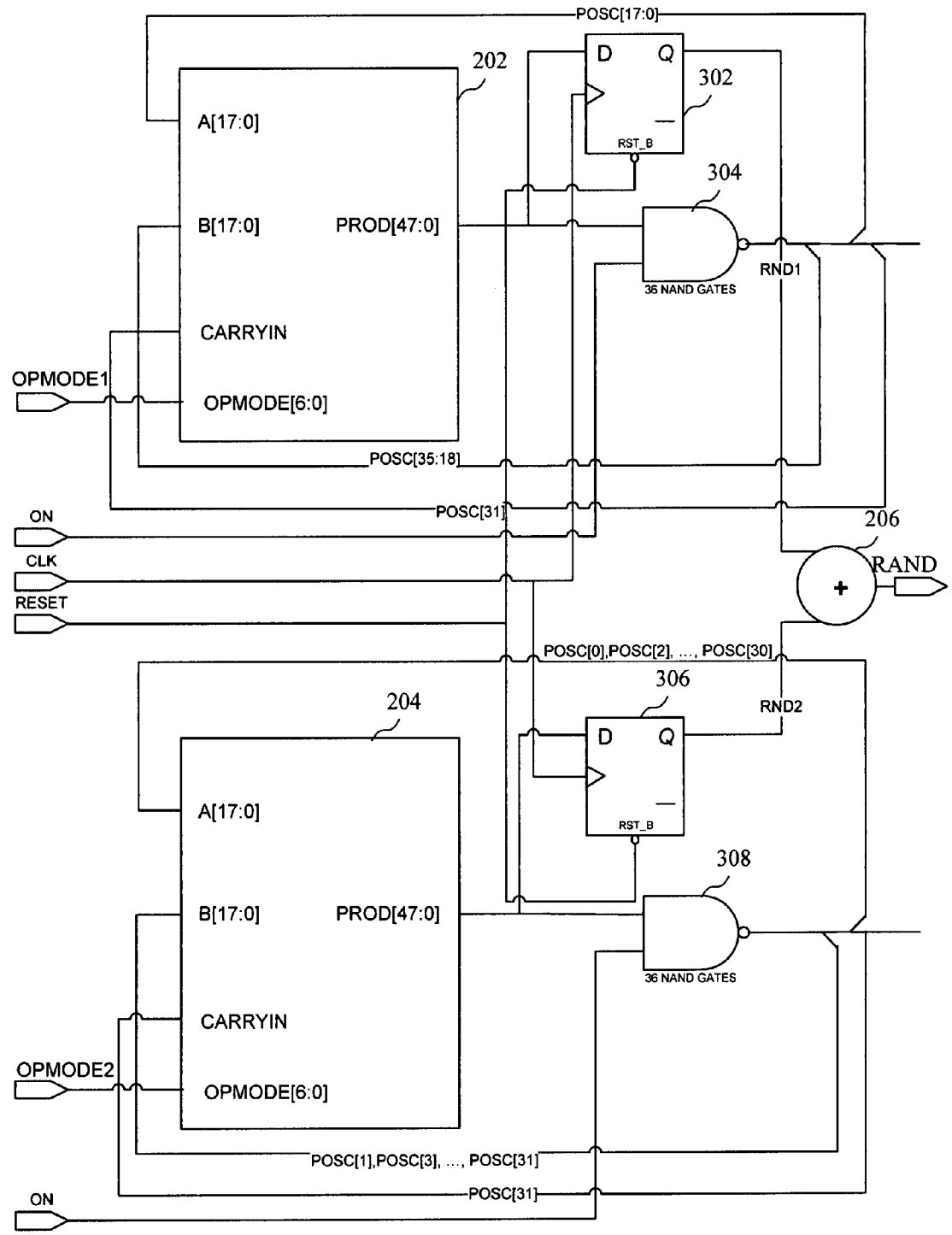
FIG. 3 is a block diagram of a programmable circuit for generating a random number according to an embodiment of the present invention.
Figure 4:
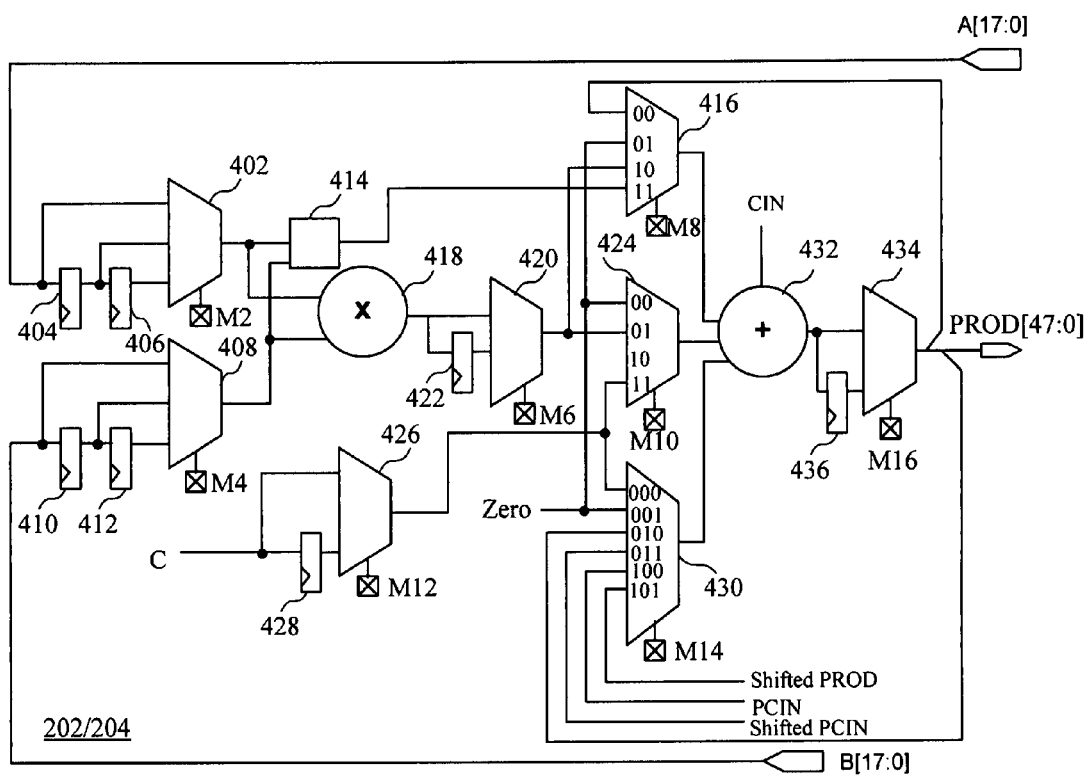
FIG. 4 is a block diagram of an adder stage or a multiplier/adder stage of the circuits of FIGS. 2 and 3 according to an embodiment of the present invention.

Turning now to FIG. 3, a block diagram of a programmable circuit for generating a random number according to an embodiment of the present invention is shown. The circuits of FIGS. 3-4 provide an example of a circuit implemented according to the embodiment of FIG. 2. The first stage 202 comprises an adder circuit coupled to receive two 18-bit inputs, A[17:0] and B[17:0]. The output PROD[47:0] of the first stage is coupled to a register 302, the output of which is coupled to the adder circuit 206. The output of the first stage is also coupled to a NAND gate 304 which is coupled to receive an ON signal to generate the inverted bits of the output PROD[47:0]. As will be described in more detail in reference to FIG. 3, the first stage 202 may be configured to function as an adder circuit based upon an operational mode signal OPMODE1. As can be seen, the least significant 18 bits POSC[17:0] of the inverted output of the NAND gate 304 are coupled to the A[17:0] input, while the next most significant 18 bits of the POSC[35:18] of the inverted output of the NAND gate 304 are coupled to the B[17:0] input of first stage 202.

The output PROD[47:0] of the second stage 204 is coupled to a register 306, the output of which is also coupled to the adder circuit 206. The output of the second stage 204 is also coupled to a NAND gate 308 which is coupled to receive the ON signal to generate the inverted bits of the output PROD[47:0] of the second stage. The second stage 204 may be configured to function as a multiplier/adder circuit based upon an operational mode signal OPMODE2. Also, as can be seen, the lowest 16 even bits of the inverted output of the NAND gate 308 are coupled to the A[17:0] input, while the lowest 16 odd bits of the inverted output of the NAND gate 308 are coupled to the B[17:0] input of second stage 204. There are only 16 feedback connections from NAND gate 308 to each 18-bit input of the second stage 204, because the two least significant bit inputs are set to zero for each of A[17:0] and B[17:0]. The registers 302 and 306 are clocked and reset according to the CLK and RESET signals. As will be described in more detail in reference to FIG. 4, the first and second stages may comprise a digital signal processor block of a programmable logic device.

Turning now to FIG. 4, a block diagram of an adder stage or a multiplier/adder stage of the circuit of FIG. 3 according to an embodiment of the present invention is shown. The circuit of FIG. 4 comprises a DSP block configured to perform different functions, based upon the values of memory elements set to configure the DSP block. The values of the memory elements are downloaded to the configurable logic block as a part of a configuration bitstream for programming a programmable logic device, as is well known in the art. For example, the DSP blocks used to implement the first and second stages of FIG. 3 may be a DSP 506 of the programmable logic device shown in FIG. 5. As will be described in more detail, the circuit of FIG. 4 may be configured differently to separately implement the functions of the first stage 202 and the second stage 204 to generate a random number.

In the pictured example, a multiplexer 402 is coupled to receive a value at an A input or one of two registered inputs stored in registers 404 and 406 based upon the value stored in a memory element M2. A multiplexer 408 is coupled to receive a value at a B input or one of two registered inputs stored in registers 410 and 412 based upon the value stored in a memory element M4. A concatenator circuit 414 is coupled to receive the output of the multiplexers 402 and 408, the concatenated output of which is coupled to a multiplexer 416. In addition to receiving the output PROD[47:0] of the circuit at an input, multiplexer 416 also receives the output of a multiplier 418, which is the product of the outputs of the multiplexers 402 and 408, or a registered product stored in a register 422, as determined by multiplexer 420 controlled by a value stored in memory element M6. The multiplexer 416 is also coupled to receive a ZERO input.

A multiplexer 424 is coupled to receive the output of the multiplexer 420, the ZERO signal, and the output of a multiplexer 426, which is coupled to receive a "C" input or a registered "C" input stored in register 428 and which is controlled by a value stored in memory element M12. A multiplexer 430 is coupled to receive the output of the multiplexer 426, the ZERO value, the output PROD[47:0] of the circuit and a shifted version of the output PROD[47:0] of the circuit. The multiplexer 430 also receives a PCIN signal and a shifted PCIN signal. The adder 432 receives the outputs of multiplexers 416, 424, and 430, and also receives the carry-in value (CIN), where the value of CIN is equal to P[31] of the output according to the example of FIG. 3. The output of the adder 432 is coupled to a multiplexer 434 which is also coupled to receive a registered value of the output of the adder 432 stored in a register 436. Multiplexer 434 is controlled by a value stored in a memory element M16. The output of the multiplexer 434 comprises the product PROD[47:0].

The OPMODE settings described above in reference to FIG. 3 are defined by memory elements M8, M10 and M14, and are set to predetermined values to select predetermined inputs to the multiplexers and implement the adder of the first stage 202 and the multiplier/adder of the second stage 204 according to the values shown in Table 1. In Table 1, the notation "A:B" signifies the output of concatenator circuit 414, "A×B" signifies the output of multiplexer 420, and "C" signifies the output of multiplexer 426. That is, when the value of the memory elements are implemented as shown in Table 1 for the first and second stages, the functions will be implemented in the first and second stages as shown in FIGS. 2 and 3.

TABLE 1

|  | MUX430 Input | M14 Value | MUX424 Input | M10 Value | MUX416 Input | M8 Value |
|---|---|---|---|---|---|---|
| First Stage 202 | P | 010 | C (C = 0) | 11 | A:B | 11 |
| Second Stage 204 | P | 010 | A × B | 01 | Zero | 01 |

Figure 5:
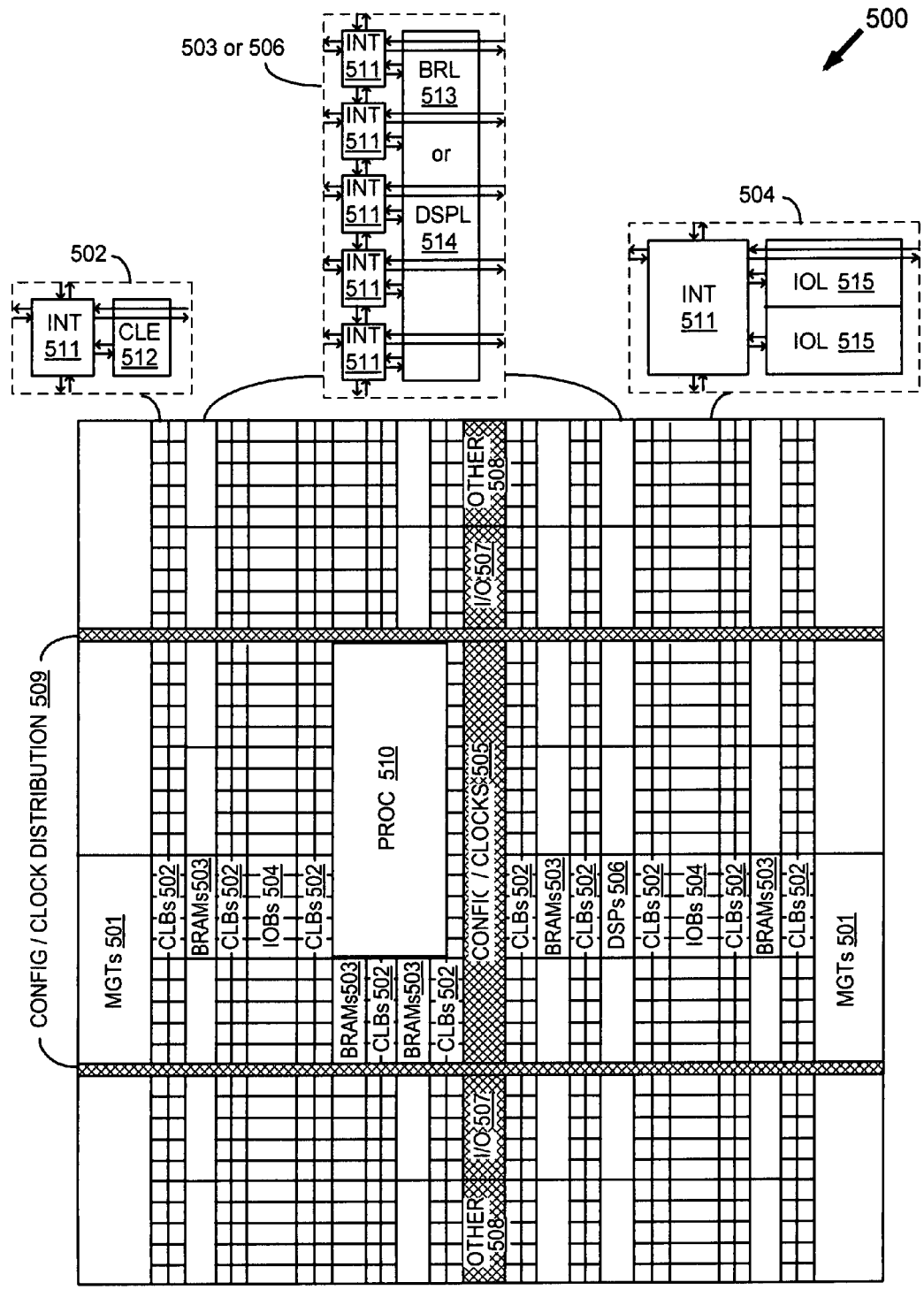
FIG. 5 is a block diagram of a programmable logic device according to an embodiment of the present invention.

Turning now to FIG. 5, a block diagram of a programmable logic device according to an embodiment of the present invention is shown. FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510). The circuits of FIGS. 1-4 may be implemented in DSPs 506, for example.

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 may include a configurable logic element (CLE 512) that may be programmed to implement user logic plus a single programmable interconnect element (INT 511). A BRAM 503 may include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) may also be used. A DSP tile 506 may include a DSP logic element (DSPL 514) in addition to an appropriate number of programmable interconnect elements. An 10B 504 may include, for example, two instances of an input/output logic element (IOL 515) in addition to one instance of the programmable interconnect element (INT 511). As will be clear to those of skill in the art, the actual I/O pads connected, for example, to the I/O logic element 515 typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks may be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA. The circuit of FIG. 5 could be implemented in a Virtex™-5 programmable logic device, available from Xilinx, Inc., San Jose, Calif. Although the 18×18 multiplier of FIG. 3 is described by way of example in FIG. 4 as a programmable DSP block, the multiplier may be implemented in any other circuit, such as a MULTI 8×18 circuit of a Virtex™-II Pro programmable logic device, also available from Xilinx, Inc., or using discrete logic elements, for example.

Figure 6:
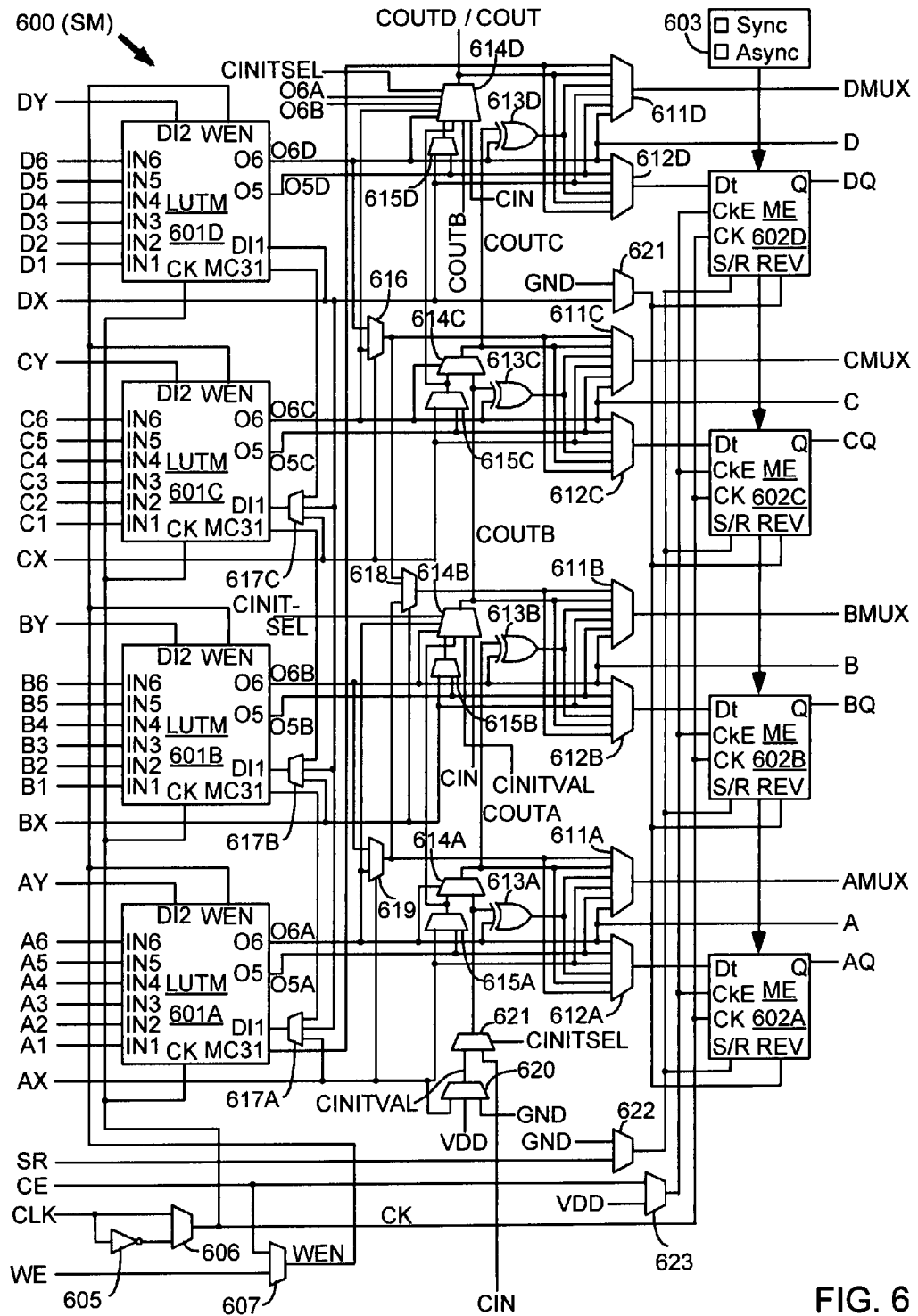
FIG. 6 is a block diagram of a configurable logic element of the programmable logic device of the FIG. 5 according to an embodiment of the present invention.

Turning now to FIG. 6, a block diagram of the configurable logic element 512 of the programmable logic device of the FIG. 5 according to an embodiment of the present invention is shown. In the embodiment of FIG. 6, slice L includes four lookup tables (LUTMs) 601A-601D, each driven by six LUT data input terminals A1-A6, B1-B6, C1-C6, and D1-D6 and each providing two LUT output signals O5 and O6. The O6 output terminals from LUTs 601A-601D drive slice output terminals A-D, respectively. The LUT data input signals are supplied by the FPGA interconnect structure via input multiplexers, which may be implemented by programmable interconnect element 511, and the LUT output signals are also supplied to the interconnect structure. Slice L also includes: output select multiplexers 611A-611D driving output terminals AMUX-DMUX; multiplexers 612A-612D driving the data input terminals of memory elements 602A-602D; combinational multiplexers 616, 618, and 619; bounce multiplexer circuits 622-623; a circuit represented by inverter 605 and multiplexer 606 (which together provide an optional inversion on the input clock path); and carry logic comprising multiplexers 614A-614D, 615A-615D, 620-621 and exclusive OR gates 613A-613D. All of these elements are coupled together as shown in FIG. 6. Where select inputs are not shown for the multiplexers illustrated in FIG. 6, the select inputs are controlled by configuration memory cells. These configuration memory cells, which are well known, are omitted from FIG. 6 for clarity.

In the pictured embodiment, each memory element 602A-602D may be programmed to function as a synchronous or asynchronous flip-flop or latch. The selection between synchronous and asynchronous functionality is made for all four memory elements in a slice by programming Sync/Asynch selection circuit 603. When a memory element is programmed so that the S/R (set/reset) input signal provides a set function, the REV input terminal provides the reset function. When the memory element is programmed so that the S/R input signal provides a reset function, the REV input terminal provides the set function. Memory elements 602A-602D are clocked by a clock signal CK, which may be provided by a global clock network or by the interconnect structure, for example. Such programmable memory elements are well known in the art of FPGA design. Each memory element 602A-602D provides a registered output signal AQ-DQ to the interconnect structure. Each LUT 601A-601D provides two output signals, O5 and O6. The LUT may be configured to function as two 5-input LUTs with five shared input signals (IN1-IN5), or as one 6-input LUT having input signals IN1-IN6.

In the embodiment of FIG. 6, each LUTM 601A-601D may function in any of several modes. When in lookup table mode, each LUT has six data input signals IN1-IN6 that are supplied by the FPGA interconnect structure via input multiplexers. One of 64 data values is programmably selected from configuration memory cells based on the values of signals IN1-IN6, as in the embodiment of FIG. 6. When in RAM mode, each LUT functions as a single 64-bit RAM or two 32-bit RAMs with shared addressing. The RAM write data is supplied to the 64-bit RAM via input terminal DI1 (via multiplexers 617A-617C for LUTs 601A-601C), or to the two 32-bit RAMs via input terminals DI1 and DI2. RAM write operations in the LUT RAMs are controlled by clock signal CK from multiplexer 606 and by write enable signal WEN from multiplexer 607, which may selectively pass either the clock enable signal CE or the write enable signal WE. In shift register mode, each LUT functions as two 16-bit shift registers, or with the two 16-bit shift registers coupled in series to create a single 32-bit shift register. The shift-in signals are provided via one or both of input terminals DI1 and DI2. The 16-bit and 32-bit shift out signals may be provided through the LUT output terminals, and the 32-bit shift out signal may also be provided more directly via LUT output terminal MC31. The 32-bit shift out signal MC31 of LUT 601A may also be provided to the general interconnect structure for shift register chaining, via output select multiplexer 611D and CLE output terminal DMUX. According to one embodiment of the invention, the adders of FIGS. 1-3 may be implemented in LUTS, while different feedback paths may be created using different programmable interconnects between the CLEs and DSPs of the PLD.

Figure 7:
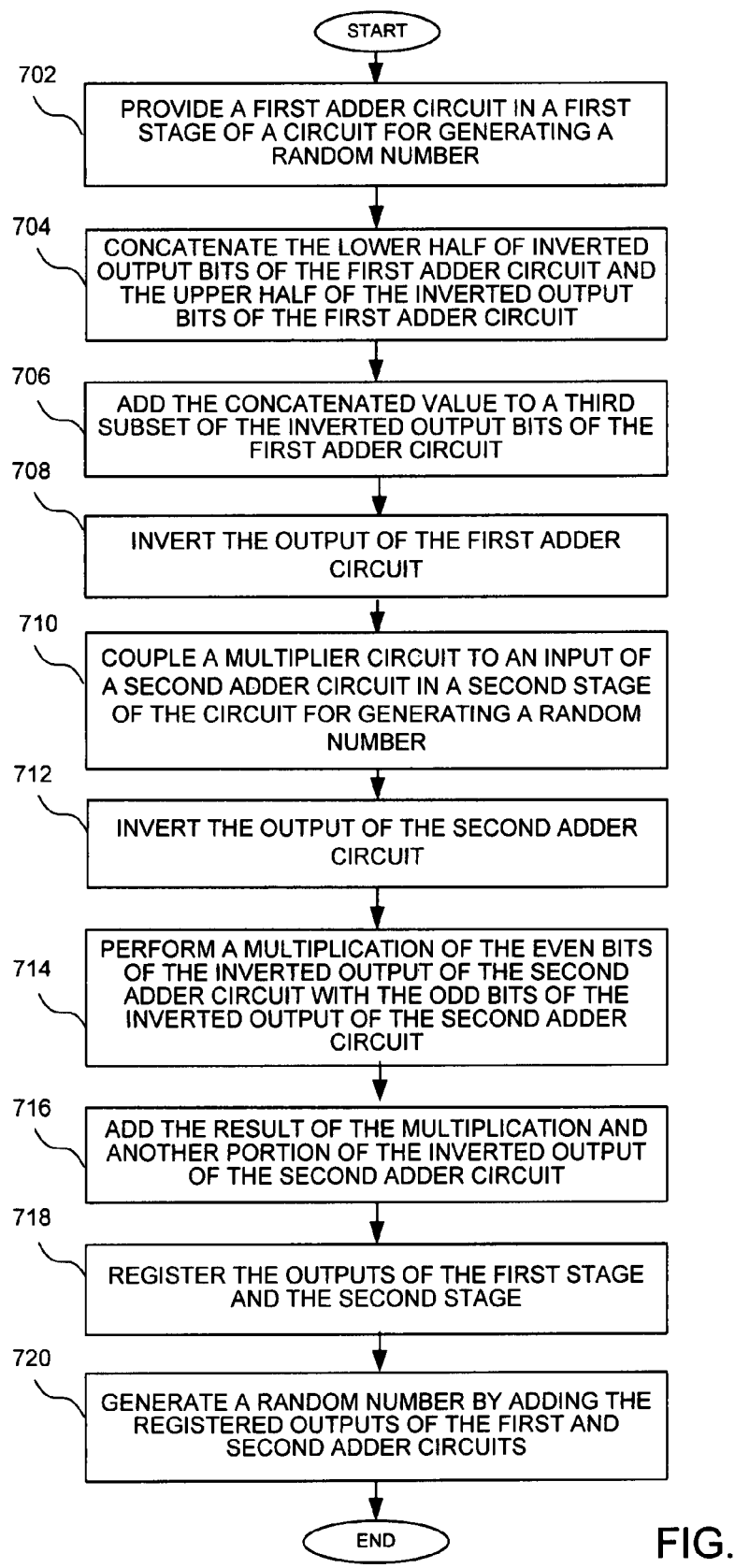
FIG. 7 is a flow chart showing a method of generating a random number according to an embodiment of the present invention.

Finally, a flow chart of FIG. 7 shows a method of generating a random number according to an embodiment of the present invention. In particular, a first adder circuit is provided in a first stage of a circuit for generating a random number at a step 702. A lower portion of inverted output bits of the first adder circuit and an upper portion of the inverted output bits of the first adder circuit are concatenated at a step 704. The concatenated lower portion of inverted output bits of the first adder circuit and the upper portion of the inverted output bits of the first adder circuit are added to a third portion of the inverted output bits at a step 706. The output of the first adder circuit is inverted at a step 708. A multiplier circuit is also coupled to an input of a second adder circuit in a second stage of the circuit for generating a random number at a step 710. The output of the second adder circuit is inverted at a step 712. A multiplication of even bits of the inverted output of the second adder circuit with odd bits of the inverted output of the second adder circuit is performed at a step 714. An addition of the result of the multiplication and another portion of the inverted output is performed in the second adder circuit at a step 716. The outputs of the first stage and the second stage are registered at a step 718. A random number is generated by adding the registered outputs of the first and second adder circuits at a step 720.

The method of FIG. 7 may be implemented using any of the circuits of FIGS. 1-6, or other suitable circuits. While the method of FIG. 7 describes a detailed method for generating a random number according to one embodiment, not all of the steps of the method of FIG. 7 are required, and the method may performed according to other embodiments related to circuits as described above.

Accordingly, a random number generator is based on a hardware multiplier, and may be implemented in FPGAs. Using the techniques described in the various embodiments above, truly random number sequences may be generated on a digital integrated circuit without the overhead required by analog circuitry. The delay of any particular path through the multiplier will generally be unique, and therefore the output will be randomly and constantly changing. The output of the multiplier may be sampled at a frequency selected by the user that is lower than the frequency of the multiplier oscillation. Implementations using a DSP48 structure of a Xilinx Virtex™-4 FPGA and the MULTI8X18 of a Xilinx Virtex™-II Pro family are shown in the Verilog HDL code which is attached on a CD ROM as a part of this application according to one aspect of the present invention. The code reproduced in this patent document contains material subject to copyright protection. The copyright owner of that material has no objection to the facsimile reproduction of the patent document or the patent disclosure, as it appears in the Patent and Trademark Office patent files or records, but otherwise reserves all copyright rights. Further, the randomness of the numbers generated using a DSP48 circuit of a Virtex™-4 FPGA has been measured using a suite of statistical analysis tests of a software tool called DIEHARD, which is publicly available as freeware. A bitstream of three million 32-bit random numbers was generated using the DSP48-based multiplier oscillator circuit. The bitstream was analyzed using the DIEHARD tool, and the p-values calculated for each test indicate that the random number bitstream is truly random.

It can therefore be appreciated that a new and novel method of and circuit for generating a random number has been described. It will be appreciated by those skilled in the art that numerous alternatives and equivalents will be seen to exist which incorporate the disclosed invention. As a result, the invention is not to be limited by the foregoing embodiments, but only by the following claims.

What is claimed is:

1. A method of generating a random number using a multiplier oscillation, the method comprising:
   providing a multi-bit multiplier circuit coupled to receive a first digital input and a second digital input, wherein the first digital input and the second digital input are asynchronous signals and each of the first digital input and the second digital input comprises a feedback signal based upon an output of the multi-bit multiplier circuit;
   allowing the multi-bit multiplier circuit to enter a state of feedback oscillation; and
   generating the random number based upon the output of the multi-bit multiplier circuit.

2. The method of claim 1, further comprising providing an adder circuit of a first stage, wherein an output of the first stage comprises a feedback signal as an input to the first stage, wherein the multi-bit multiplier circuit comprises a second stage separate from the first stage, and said generating the random number is based upon the outputs of the first stage and the second stage.

3. The method of claim 2, wherein the second digital input comprises a feedback signal based upon an output of the second stage.

4. The method of claim 3, further comprising adding an output of the multi-bit multiplier circuit to a second feedback signal based upon the output of the second stage.

5. The method of claim 4, wherein generating the random number comprises adding the output of the first stage to the output of the second stage.

6. The method of claim 5, wherein generating the random number based upon the output of the multi-bit multiplier circuit comprises registering the output of the multi-bit multiplier circuit at a predetermined clock rate.

7. A method of generating a random number using a multiplier oscillation, the method comprising:
providing a first adder circuit in a first stage of a circuit for generating a random number;
performing an addition using a first subset of an output of the first adder circuit and a second subset of the output of the first adder circuit;
coupling a multiplier circuit to an input of a second adder circuit in a second stage of the circuit for generating a random number;
performing a multiplication of a first subset of an output of the second adder circuit with a second subset of the output of the second adder circuit; and
generating the random number by adding the output of the first adder circuit and the output of the second adder circuit.

8. The method of claim 7, wherein performing the addition comprises performing the addition using a concatenation of the first subset of the output of the first adder circuit and the second subset of the output of the first adder circuit.

9. The method of claim 7, further comprising inverting the output of the first adder circuit.

10. The method of claim 9, further comprising concatenating an inverted first subset of the output of the first adder circuit and an inverted second subset of the output of the first adder circuit.

11. The method of claim 10, wherein performing the addition comprises adding the concatenation of the inverted first subset of the output of the first adder and the inverted second subset of the output of the first adder circuit to an inverted third subset of the output of the first adder circuit.

12. The method of claim 7, wherein:
the first subset of the output of the first adder circuit comprises lower bits of the output of the first adder circuit;
the second subset of the output of the first adder circuit comprises higher bits of the output of the first adder circuit;
the first subset of the output of the second adder circuit comprises even bits of the output of the second adder circuit; and
the second subset of the output of the second adder circuit comprises odd bits of the output of the second adder circuit.

13. The method of claim 7, wherein generating the random number comprises adding registered outputs of the first adder circuit and the second adder circuit.

14. A system for generating a random number using a multiplier oscillation, the system comprising:
a multi-bit multiplier circuit coupled to receive a first digital input and a second digital input, wherein the first digital input and the second digital input are asynchronous signals;
a feedback path coupled between an output of the multi-bit multiplier circuit and an input of the multi-bit multiplier, wherein each of the first digital input and the second digital input comprises a feedback signal based upon the output of the multi-bit multiplier circuit; and
an output circuit coupled to provide a random number at an output of the system based upon the output of the multi-bit multiplier circuit.

15. The system of claim 14, further comprising a first adder circuit of a first stage, the first adder circuit performing an addition using a first subset of an output of the first adder circuit and a second subset of the output of the first adder circuit, wherein the multi-bit multiplier circuit comprises a second stage separate from the first stage.

16. The system of claim 15, further comprising a second adder circuit of the second stage, wherein the multi-bit multiplier circuit performs a multiplication of a first subset of an output of the second adder circuit with a second subset of the output of the second adder circuit in the second stage.

17. The system of claim 16, further comprising a third adder coupled to receive an output of the first adder circuit and an output of the second adder circuit to generate the random number.

18. The system of claim 17, further comprising a first register coupled to receive the output of the first adder circuit and a second register coupled to receive the output of the second adder circuit, wherein the third adder is coupled to receive the output of the first register and the output of the second register.

19. The system of claim 18, further comprising a first inverter at the output of the first adder and a second inverter at the output of the second adder, wherein the first subset of the output of the first adder comprises an inverted output of the first adder and the first subset of the output of the second adder comprises an inverted output of the second adder.

* * * * *